Sept. 17, 1963  J. P. SKLADANY  3,104,085
COMPRESSED FIBROUS ARTICLES

Filed July 18, 1960  2 Sheets-Sheet 1

INVENTOR.
Joseph P. Skladany
BY
his ATTORNEY

Sept. 17, 1963     J. P. SKLADANY     3,104,085
COMPRESSED FIBROUS ARTICLES

Filed July 18. 1960     2 Sheets-Sheet 2

INVENTOR.
Joseph P. Skladany
BY
his ATTORNEY

United States Patent Office 3,104,085
Patented Sept. 17, 1963

3,104,085
COMPRESSED FIBROUS ARTICLES
Joseph P. Skladany, Pittsburgh, Pa., assignor to Industrial Paper Log, Inc., Pittsburgh, Pa., a corporation of Pennsylvania
Filed July 18, 1960, Ser. No. 43,507
2 Claims. (Cl. 248—119)

This invention relates to articles formed from compressed fibrous waste materials, and more particularly to articles of the type described which are adapted to replace the lumber and other similar materials at a much lower cost.

In copending application Serial No. 42,835, filed July 14, 1960, a compressed fibrous material is described as well as a process for making the same from waste material such as, for example, lignin, fly ash and waste paper. Specifically, the application describes a process wherein fibrous waste material is initially pulped and then passed to a pug mill where it is thoroughly mixed with water, a filler and an adhesive agent. From the pug mill, the mixture may be fed to an extruder which produces a continuous length of the formed fibrous product, the continuous article thus formed being thereafter cut into lengths and dried. Alternatively, the mixture from the pug mill may be poured into a die and pressed into the desired shape. The fibrous waste material is preferably scrap paper; however, other fibrous materials may be used such as waste wood, sawdust, bagasse, hemp, jute, rags, corn stocks, straw, dried grasses, seaweed and others. Grain starch or lignin provide adhesives which give good strength and other desirable characteristics to the final product while being relatively inexpensive; however, duraband or sodium silicate may be employed as well as various types of thermosetting resins. The filler used is preferably fly-ash which is a carbonaceous material of extremely low cost; however, it may comprise granulated slag, clay, perlite, lithopone, calcium carbonate, talc, cinders, sand, shale, expanded slate, vermiculite, as well as others. In this respect, one of the primary advantages of the material used in the present invention resides in the fact that up to about 35 percent of its total weight may comprise the filler which has a cost much less than that of waste paper or other similar fibrous waste material.

An article compressed from a fibrous material of the type described above has many of the characteristics of lumber and other similar materials. It has very good compressive strength, reasonably good bending strength, and actually has better nail-holding capabilities than its lumber counterpart. At the same time, the product is much cheaper than lumber and is infinitely more versatile, as well as being lighter than lumber. Since the product is formed from a plastic pulp mixture, it may be easily and cheaply extruded into various cross sectional configurations which would be attainable with lumber only by means of an expensive planing or milling operation. Furthermore, it may be formed in a die into various integral one-piece structures, which in the case of lumber, would have to be constructed from a plurality of individual pieces which are nailed together. One such application for the product is in the manufacture of load-carrying pallets where an entire pallet may be formed in a single pressing operation. To construct such a pallet from lumber would require that the individual boards, spacing blocks, etc., of the pallet may be individually cut to length and then nailed together, a process requiring a considerable amount of labor.

As will be seen, the invention is particularly adapted for use as a substitute for dunnage lumber, although it is by no means limited thereto. Ordinary dunnage lumber is cut into lengths of rectangular cross section; and although other configurations are oftentimes more suitable for a particular shipping or packaging application, it would be altogether too costly to alter the shape of such dunnage in a milling, cutting or planing operation. One specific example of this is found in packaging sheet steel where the sheets are piled on skids and secured thereto by means of flat metal strips or bands. Since the skids formed from dunnage lumber are rectangular in cross section, the bands must pass over the area of the skids which slide on the floor, meaning that the bands can get caught on rough and uneven surfaces or possibly break. It is, of course, possible to mill slots in the lumber to recess the bands above the sliding surfaces; however, the cost of such an operation would be prohibitive. By virtue of the fact that the material of the present invention may be extruded into any desired shape in its initial formation, slots or the like may be easily provided without adding to the cost of the product.

Another drawback of dunnage lumber arises in the shipment of tubular and coiled products where, because of the flat surfaces of the lumber, pipes or coils may roll off skids or guide strips on which they are placed. The material of the present invention, on the other hand, may be extruded with elongated ribs extending along its sides, and the composition of the material may be varied whereby these ribs will compress under the weight of tubes or coils, thereby producing a nesting or seating action which prevents the product from rolling.

Additional articles which may be produced from the pulp mixture described above include without limitation, tubular products such as mailing and packaging tubes, containers, drainage pipes, molds for concrete construction, and others. In the case of drainage pipes and the like where the product must be leakproof, waterproofing agents must be added during the manufacture of the product or the product must be impregnated with a waterproofing agent after its formation. For the building industry, the product may be formed into articles such as wall board, decorative moldings, core stock for veneers, insulating panels and cushioning material.

Accordingly, as a primary object, the present invention provides compressed fibrous articles adapted to replace lumber and other similar materials at a much lower cost.

Another object of the invention is to provide an artificial wood product formed into such shape as to be conveniently sectioned to provide supporting, carrying or spacing means for various objects.

A further object of the invetnion is to provide a compressed fibrous article in the form of a tube which may be waterproofed and employed as a fluid-carrying conduit.

Still another object of the invention is to provide columns of an artificial wood product having ribs extending along their longitudinal sides, with the composition of the artificial wood product being such that the ribs will compress under a load to provide a seating or nesting effect for tubular and other articles positioned thereon.

The above and other objects and features of the invention will become apparent from the following detailed description taken in connection with the accompanying drawings which form a part of this specification and in which:

FIG. 6 illustrates an application of the column of material shown in FIG. 2 as a replacement for dunnage lumber skids used in the shipment of steel sheets or the like;

Figure 8:
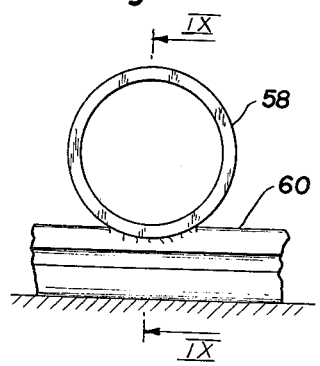
Figure 9:
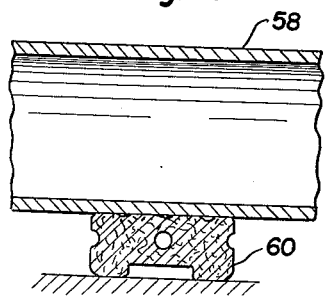

FIG. 8 further illustrates the nesting or seating action which may be produced in the product of the invention;

FIG. 9 is a cross-sectional view taken along line IX—IX of FIG. 8; and

Figure 10:
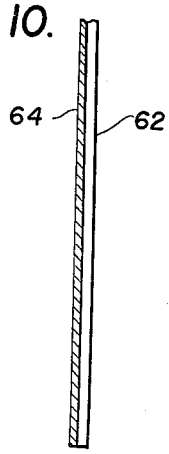

FIG. 10 illustrates the use of the invention as a backing for a wood veneer or the like.

The compressed fibrous material from which the various articles of the invention are formed may have the following broad and preferred ranges of composition:

| Constituent | Analysis of Compressed Fibrous Product—Percent by Weight | |
|---|---|---|
| | Broad | Preferred |
| Fiber | 55 to 75 | 60 to 70 |
| Filler | 10 to 35 | 16 to 30 |
| Adhesive | 4 to 20 | 4 to 20 |

As was mentioned above, in the manufacture of the product, fibrous material is initially pulped and then pressed to a pug mill where it is thoroughly mixed with water, a filler and an adhesive. From the pug mill the plastic mixture of fibrous material, filler, adhesive and water may be fed to a continuous extrusion machine or a press. During forming of the article in the extrusion machine or the press, excess water is expressed from the mixture to form a wet, solid article which is then air dried. After the article dries, it may be used for various useful applications, as will hereinafter become apparent.

Figure 1:
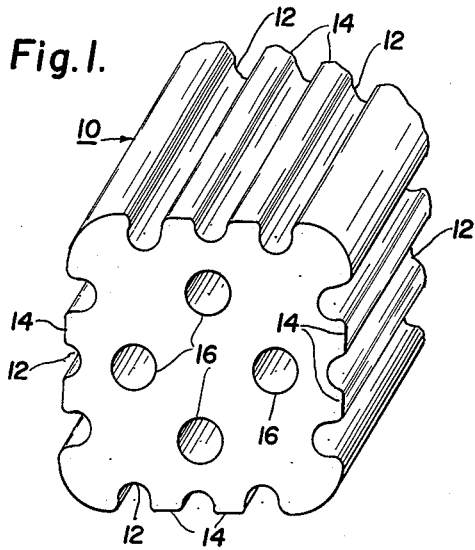
FIGURE 1 is a perspective view of a fragmental section of a continuous column of fibrous material made in accordance with the present invention.

Referring to FIG. 1, the article 10 shown is a compressed fibrous product which was extruded into a continuous length from the mixture described above. As will be understood, the extrusion die is formed to provide a plurality of slots 12 along the four sides of the article to thereby produce longitudinally extending ribs 14. The extrusion die also includes four mandrels to provide longitudinally-extending passageways 16 through the article. Passageways 16 not only lighten the product but also facilitate drying of the fibrous material after extrusion. The article shown in FIG. 1 is particularly adapted for use as dunnage lumber and may replace a conventional lumber 4 x 4 while being much lighter than its natural wood counterpart. Tubular products and coils, for example, may be positioned on a side of the article such that the ribs 14 formed between grooves 12 will compress to form a seating or nesting action for the load as will hereinafter be explained.

Figure 2:
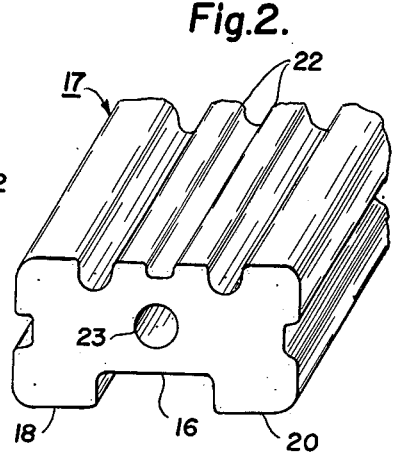
FIG. 2 is a perspective view of another continuous column of material embodying a modification of the present invention.

In FIG. 2, another embodiment of the invention is shown which is similar to that of FIG. 1 except that in this case, a long slot 16 is provided along the bottom of the article 17 whereby steel strapping may extend through the slot while the surfaces 18 and 20 slide along the floor when the material is used for skids under sheets of steel or the like. As was the case with the article of FIG. 1, elongated ribs 22 are formed in the sides of the product as well as a passageway 23 extending longitudinally through its central portion. The article shown in FIG. 2 may replace a conventional lumber 2 x 4 but is much more suitable than the lumber since it includes the slot 16 as well as the ribs 22 similar to those shown in FIG. 1. To mill a slot similar to 16 in a dunnage lumber 2 x 4 would be economically prohibitive.

Figure 6:
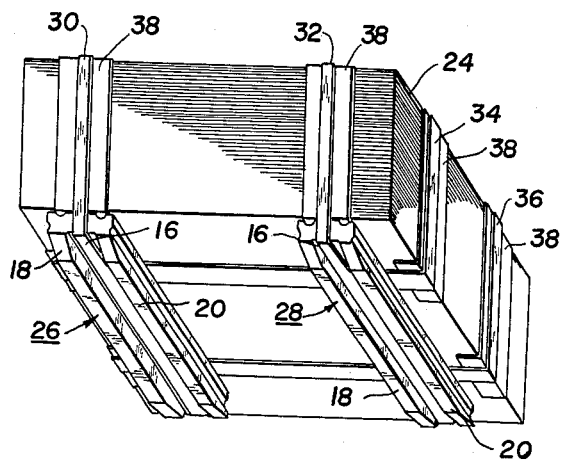

In FIG. 6, the use of the article of FIG. 2 is shown as skids for shipment of sheet steel. Sheets 24 are arranged on top of a pair of compressed columns or skids 26 and 28 arranged in parallel relationship. It will be noted that the cross-sectional configuration of the skids 26 and 28 is the same as that of the article of FIG. 2. That is, they are provided with slots 16 extending longitudinally along their lower surfaces. Received within the slots 16 of skids 26 and 28 are a pair of steel straps 30 and 32 which pass around the sheets 24 and are drawn taut to secure the skids to the pile. Transversely-extending straps 34 and 36 are also provided to secure the sheets in a unitary bundle; however, these straps pass above the skids 26 and 28 rather than underneath as in the case of straps 30 and 32. In order to protect the sheets and to enhance securement, steel cushions 38 are placed under the straps 30—36 at the corners of the pile. When the assembled pile is moved across the floor, for example, it will slide on the surfaces 18 and 20 of the skids 26 and 28 with the straps 30 and 32 being recessed to prevent damage to the same and eliminate the possibility of their catching on rough and uneven ground surfaces.

Figure 3:
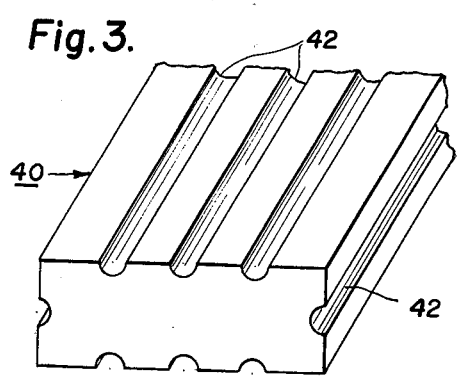
FIG. 3 is a perspective view of still another continuous column of material made in accordance with the present invention.
Figure 4:
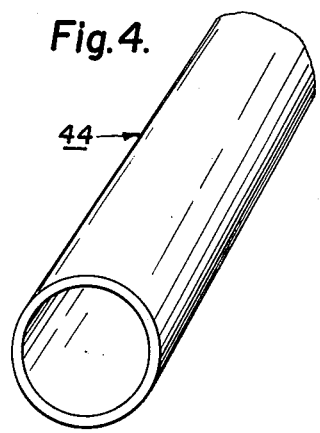
FIG. 4 is a perspective view of a tubular product made in accordance with the teachings of the invention.

FIGS. 3 and 4 illustrate other articles formed from the compressed fibrous material of the invention. In FIG. 3, a solid column or log 40 is formed having a plurality of longitudinally extending slots formed in its sides, similar to the embodiments of FIGS. 1 and 2. In this case, however, the log is relatively thin so that it becomes unnecessary to provide longitudinal passageways through its center to facilitate drying. The article shown in FIG. 3 may correspond to a conventional lumber 1 x 3 and can be used, for example, as reinforcing strips on the floors of railroad cars in the shipment of steel products. In FIG. 4, the article formed is a tube 44 which may have any one of a plurality of applications including mailing tubes, fluid conduits, containers, and forms for concrete construction, to name a few. If the tubular member is to be used as drainage pipe or to otherwise convey a liquid, it must be waterproofed by the use of a waterproofing material which may be incorporated into the fibrous pulp mixtures before the tube is formed. In certain cases, however, it will be necessary to impregnate the tubular article with a waterproofing agent after it is formed.

Figure 5:
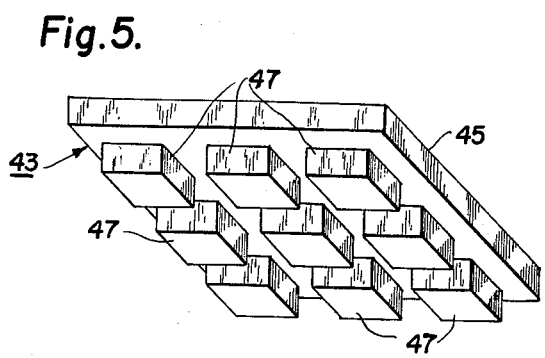
FIG. 5 is a perspective view of a load-carrying pallet formed from the compressed fibrous material of the invention.

In FIG. 5 a pallet 43 is shown which was formed from a mixture of fibrous waste material, a filler, an adhesive and water, this mixture being the same as that for the extruded products. The pallet in this case comprises a platform 45 having a plurality of integral legs or columns 47 extending downwardly therefrom, the arrangement being such that a plurality of such columns 47 are spaced across the entire lower surface of platform 45 to give it the required support. In this way, substantially the entire load on the pallet is taken by compression in the columns 47 and very little is absorbed by bending stresses in the platform 45 itself. In the formation of the pallet shown in FIG. 2, a fibrous pulp mixture of the type described above will be pressed into the desired shape, whereupon the formed article will be removed from the die and allowed to dry in the air in much the same way as continuous articles are produced in an extrusion process. One major advantage of such a pallet is the fact that it is a one-piece or integral structure requiring no nails or other fastening members to secure separate parts together as in a conventional wooden pallet. At the same time, it eliminates the labor involved in cutting the lumber and assembling a wooden pallet.

Figure 7:
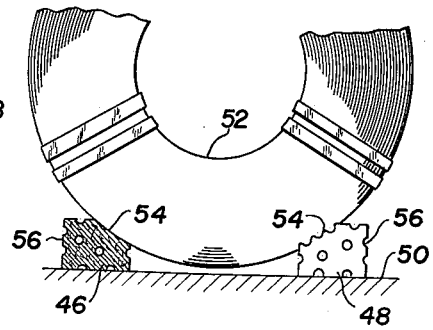
FIG. 7 is a showing of the use of the invention as dunnage for the shipment of steel coils and the like, illustrating the nesting or seating effect produced by the longitudinal ribs provided in continuous columns of material, such as those shown in FIGS. 1 and 2.

Referring now to FIG. 7, a pair of compressed fibrous logs 46 and 48 are shown nailed to the floor 50 of a boxcar or truck supporting a coil of steel strip 52. In this case, however, the logs 46 and 48 are extruded to provide a beveled surface 54 on one edge to fit the contour of the coil 52. As with the embodiments of FIGS. 1, 2 and 3, logs 46 and 48 are provided with longitudinally-extending grooves 56 along their sides as well as the beveled surfaces 54. Log 46 is shown in cross section at the point where the coil 52 is seated thereon; whereas an end view of log 48 is given. The composition of the logs 46 and 48 is adjusted whereby the ribs formed between grooves 56 will compress under the weight of the coil 52. Thus, with reference to log 46, it will be seen that the ribs on the beveled surface 54 are compressed or flattened at the area of contact between the coil 52 and the log. The remaining portion of the log, as illustrated by the showing of log 48, still retains the ribs along the beveled surface 54, the result being that a depression is formed in the area of contact between the coil 52 and the logs 46 and 48, thereby providing a nesting or seating action which impedes any tendency of the coil 52 to roll off the logs 46 and 48. If beveled surfaces 54 were to be provided in dunnage lumber, for example, it would require an additional cutting operation; whereas, in the present invention this beveled surface is provided when the log is initially formed without the necessity for any auxiliary operations. In any event, even if dunnage lumber were provided with beveled surfaces such as surfaces 54, line contact would still be made between the coil 52 and the lumber, thereby decreasing the frictional resistance between the coil and the lumber and making it easier for the coil to roll off of the lumber blocks.

FIGS. 8 and 9 also illustrate the nesting or seating action produced by the longitudinally-extending ribs on the sides of the product. In this case, however, a pipe or tube 58 extends transversely of the ribs in the compressed fibrous log 60. In an actual application, there will probably be a plurality of such tubes positioned on log 60, and the combined weight of these tubes will force the lowermost ones to compress the ribs in the log 60, thereby preventing the entire pile of tubes from rolling off the logs.

FIG. 10 is still another application of the invention wherein a sheet 62 of the compressed fibrous material is used as a backing for a wood veneer 64 or the like. In this case, the wood veneer is glued or otherwise securely fastened to the fiber backing 62 which provides rigidity and strength for the product.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A support member for spacing or carrying an object being transported comprising an elongated extruded column having generally parallel sides, and a plurality of longitudinally-extending ribs formed in said sides during extrusion with the ribs extending along one transverse dimension of the column and with the material of the column comprising compressed fibrous material containing an adhesive agent, said longitudinally-extending ribs being non-resiliently deformable under compression to form a permanent depression therein under the weight of an object placed on the column to produce a seating or nesting effect.

2. The support member of claim 1 wherein the compressed fibrous material comprises waste paper.

References Cited in the file of this patent

UNITED STATES PATENTS

| | | |
|---|---|---|
| 652,144 | Skrobanek | June 19, 1900 |
| 947,508 | Wright | Jan. 25, 1910 |
| 1,995,145 | Frost | Mar. 19, 1935 |
| 2,446,304 | Roman | Aug. 3, 1948 |
| 2,447,712 | Nathan | Aug. 24, 1948 |
| 2,534,137 | Lewis | Dec. 12, 1950 |
| 2,614,689 | Miller | Oct. 21, 1952 |
| 2,626,456 | Harrison | Jan. 27, 1953 |
| 2,705,197 | Seybold | Mar. 29, 1955 |
| 2,854,230 | Jones | Sept. 30, 1958 |
| 2,903,218 | Altenburg | Sept. 8, 1959 |